US012095899B2

(12) United States Patent
Reddy et al.

(10) Patent No.: US 12,095,899 B2
(45) Date of Patent: Sep. 17, 2024

(54) AUTOMATED DEVELOPMENT, DEPLOYMENT AND INTEGRATION SERVICE FOR DISTRIBUTED LEDGER-ENABLED APPLICATIONS

(71) Applicant: SAP SE, Walldorf (DE)

(72) Inventors: Srinivasa Byaiah Ramachandra Reddy, Singapore (SG); Ashwin Srinivasa, Singapore (SG)

(73) Assignee: SAP SE, Walldorf (DE)

( * ) Notice: Subject to any disclaimer, the term of this patent is extended or adjusted under 35 U.S.C. 154(b) by 380 days.

(21) Appl. No.: 17/066,607

(22) Filed: Oct. 9, 2020

(65) Prior Publication Data
US 2022/0116201 A1 Apr. 14, 2022

(51) Int. Cl.
*H04L 9/06* (2006.01)
*G06F 16/22* (2019.01)
*H04L 9/00* (2022.01)

(52) U.S. Cl.
CPC ........ *H04L 9/0643* (2013.01); *G06F 16/2282* (2019.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2006/0282524 | A1* | 12/2006 | Lacombe | G06F 9/542 709/224 |
| 2009/0077085 | A1* | 3/2009 | Olivieri | G06F 16/2393 707/999.009 |
| 2009/0319581 | A1* | 12/2009 | Seifert | G06F 16/22 |
| 2014/0114907 | A1* | 4/2014 | Kozina | G06F 16/219 707/602 |

OTHER PUBLICATIONS

Schuster "SAP HANA Blockchain: An introduction" [online] SAP, Jun. 2018 [retrieved Nov. 18, 2022] Retrieved via Internet: URL: https://blogs.sap.com/2018/06/13/sap-hana-blockchain-a-technical-introduction/. Connected Video URL: https://sapvideoa35699dc5.hana.ondemand.com/?entry_id=1_iu4u2gic (slides inc) (Year: 2018).*

(Continued)

*Primary Examiner* — Taghi T Arani
*Assistant Examiner* — Joshua Raymond White
(74) *Attorney, Agent, or Firm* — Fish & Richardson P.C.

(57) ABSTRACT

Methods, systems, and computer-readable storage media for providing a DLS-enriched view on data stored in a database system, the DLS-enriched view including a set of annotations indicating at least one application table and at least one field of the application table, storing a staging table corresponding to the application table field and a database trigger that is configured to write data from the field to the staging table in response to a change in the at least one application table, providing at least one IR artifact based on the DLS-enriched view, generating at least one DLS-specific entity and chaincode based on the IR artifact and a configuration for a DLS, to which the chaincode is to be deployed, deploying the chaincode to the DLS, and monitoring the one or more staging tables for changes and, in response to a change, recording data of the staging table to the DLS.

20 Claims, 6 Drawing Sheets

(56) References Cited

OTHER PUBLICATIONS

Ramakrishnan "SAP and Blockchain" [online] SAP, May 2019 [retrieved Nov. 18, 2022]. Retrieved via internet: URL: https://blogs.sap.com/2019/05/28/sap-and-blockchain (Year: 2019).*

Schuster "SAP HANA Blockchain: Technical Overview" [online] SAP, Aug. 2018 [retrieved May 2, 2023] Retrieved via Internet: URL: https://web.archive.org/web/20221006075704/https://blogs.sap.com/2018/08/28/sap-hana-blockchain-technical-overview/ (Year: 2018).*

Schuster "SAP HANA Blockchain: Setup SAP HANA, express edition" [online] SAP, Aug. 2018 [retrieved May 2, 2023]. Retrieved via Internet: URL: https://web.archive.org/web/20220630184935/https://blogs.sap.com/2018/08/29/sap-hana-blockchain-setup-sap-hana-express-edition-for-hana-blockchain/ (Year: 2018).*

Schuster Archive "SAP HANA Blockchain: An introduction" [online] SAP, Jun. 2018 [retrieved Nov. 18, 2022] Retrieved via Internet: URL: https://web.archive.org/web/20221001045701/https://blogs.sap.com/2018/06/13/sap-hana-blockchain-a-technical-introduction/ (Year: 2018).*

Pn, Nitin "How to plan a successful Data Migration project" [online] LinkedIn, May 2018 [retrieved May 3, 2023] Retrieved via Internet: URL: https://www.linkedin.com/pulse/how-plan-successful-data-migration-project-nitin-pn (Year: 2018).*

Schuster, "SAP HANA Blockchain is now generally available!" Nov. 2, 2018, retrieved on Aug. 10, 2023, retrieved from URL <https://blogs.sap.com/2018/11/02/sap-hana-blockchain-is-now-generally-available/>, 5 pages.

* cited by examiner

AUTOMATED DEVELOPMENT, DEPLOYMENT AND INTEGRATION SERVICE FOR DISTRIBUTED LEDGER-ENABLED APPLICATIONS

BACKGROUND

Software systems can be provisioned by software vendors to enable enterprises to conduct operations. Software systems can include various applications that provide functionality for execution of enterprise operations. In some instances, software systems can include or operate in association with a database system. Applications can be provided in an application layer that overlies a database system and enable interactions with the database system (e.g., reading data, writing data, manipulating data). In general, database systems provide for storage, organization, and analysis of large volumes of data. A database system employs fundamental data definitions and processing based on a relational model, where a data definition defines a data type with metadata associated therewith. A data definition can provide a database structure (e.g., columns, tables). In some instances, a query language is used to define, read, and manipulate data within a database system.

Decentralized systems have been developed to enhance information security. An example decentralized system includes a so-called distributed ledger system (DLS), which can also be referred to as a consensus network, and/or a blockchain network. DLSs enable participating entities to securely, and immutably store data within a distributed ledger, also referred to as a blockchain. The distributed ledger is decentralized in that multiple nodes in the DLS have to reach consensus as to the information stored in the distributed ledger, and in that a copy of the ledger is stored in multiple nodes across the DLS. Once stored in the distributed ledger, the data is considered to be immutable.

With the increasing popularity of DLSs, software vendors seek to develop DLS-enabled applications (i.e., applications that interact with a DLS to store and/or verify data) to leverage the benefits of DLSs. However, implementing a productive DLS-enabled application can be a time- and resource-intensive endeavor. For example, to achieve this, tasks can include: creating a DLS, creating an operation-specific DLS-enabled application depending on the choice of DLS platform, deploying the DLS-enabled application for use with a DLS network, lifecycle management for the DLS-enabled applications, and integration of non-DLS-enabled applications with the deployed DLS-enabled applications (e.g., maintaining transactional consistency between non-DLS-enabled applications and DLS-enabled applications). These example tasks need to be achieved using technical solutions that provide time- and resource-efficiency.

SUMMARY

Implementations of the present disclosure are directed to development, deployment, and integration of applications that leverage a distributed ledger system (DLS). More particularly, implementations of the present disclosure are directed to an automated development, deployment, and integration service (ADDIS) for developing, deploying, and integrating DLS-enabled applications.

In some implementations, actions include providing a DLS-enriched view on data stored in a database system, the DLS-enriched view including a set of annotations indicating at least one application table and at least one field of the application table that is DLS-enabled, storing, in the database system, a staging table corresponding to the at least one application table and at least one field of the application table and a database trigger that is configured to write data from the at least one field of the application table to the staging table in response to a change in the at least one application table, providing at least one intermediate representative (IR) artifact based on the DLS-enriched view, generating at least one DLS-specific entity and chaincode based on the IR artifact and a configuration for a DLS, to which the chaincode is to be deployed, deploying the chaincode to the DLS, and monitoring the one or more staging tables for changes and, in response to a change, recording data of the one or more staging tables to the DLS based on the chaincode. Other implementations of this aspect include corresponding systems, apparatus, and computer programs, configured to perform the actions of the methods, encoded on computer storage devices.

These and other implementations can each optionally include one or more of the following features: the set of annotations includes a DLS-enable annotation and a DLS attribute annotation, the DLS attribute annotation indicating the at least one field; the IR artifact is DLS-agnostic; the chaincode is a DLS-enabled application that is specific to the DLS and includes at least a portion of functionality of the application; the application selectively writes data to the at least one field; the at least one DLS-specific entity is specific to the DLS; and actions further include deleting the data from the one or more staging tables in response to confirmation that the data has been recorded to the DLS.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
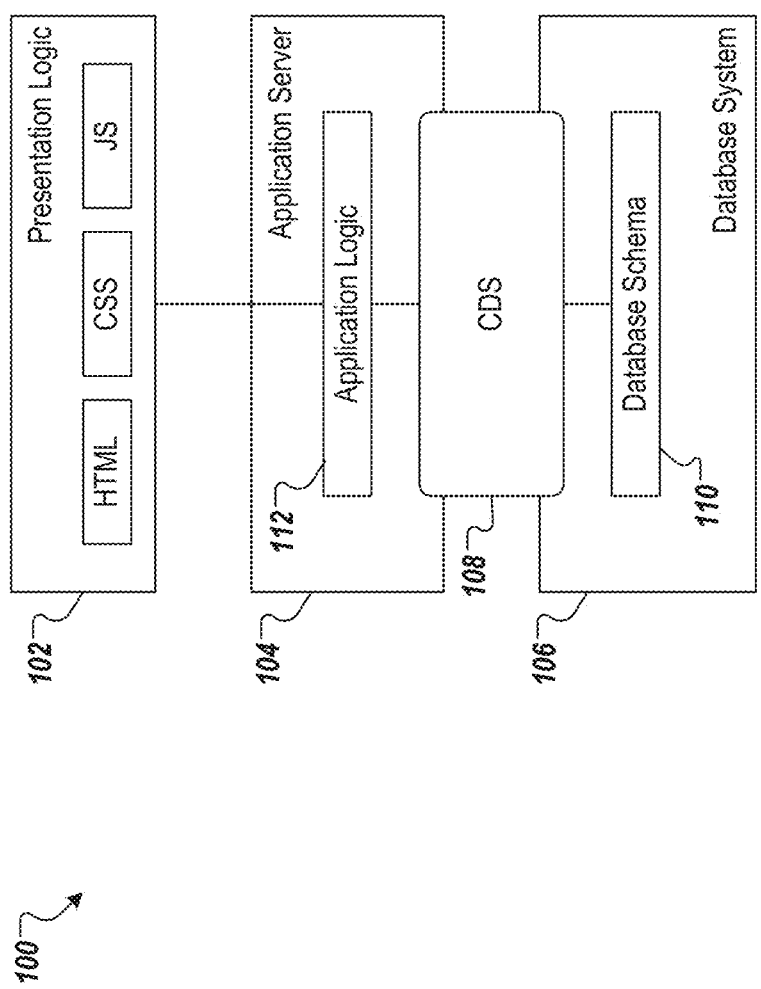
FIG. 1 depicts an example high-level architecture that can be used to execute implementations of the present disclosure.

Implementations of the present disclosure are directed to development, deployment, and integration of applications that leverage a distributed ledger system (DLS). More particularly, implementations of the present disclosure are directed to an automated development, deployment, and integration service (ADDIS) for developing, deploying, and integrating DLS-enabled applications. Implementations can include actions of providing a DLS-enriched view on data stored in a database system, the DLS-enriched view including a set of annotations indicating at least one application table and at least one field of the application table that is DLS-enabled, storing, in the database system, a staging table corresponding to the at least one application table and at least one field of the application table and a database trigger that is configured to write data from the at least one field of the application table to the staging table in response to a change in the at least one application table, providing at least one intermediate representative (IR) artifact based on the DLS-enriched view, generating at least one DLS-specific entity and chaincode based on the IR artifact and a configuration for a DLS, to which the chaincode is to be deployed, deploying the chaincode to the DLS, and monitoring the one or more staging tables for changes and, in response to a change, recording data of the one or more staging tables to the DLS based on the chaincode.

Implementations of the present disclosure are also described in further detail herein with reference to systems, components, data modeling tools, and the like provided by SAP SE, as non-limiting examples. It is contemplated that implementations of the present disclosure can be realized using any appropriate systems, components, data modeling tools, and the like.

Implementations of the present disclosure are described in further detail with reference to an example database system. The example database system is provided as the SAP HANA in-memory database system provided by SAP SE of Walldorf, Germany. An example software system executing with SAP HANA includes S/4 HANA, which can be described as a large-scale enterprise resource planning (ERP) system. SAP HANA can be described as a data platform that processes transactions and analytics at the same time on any data type, with built-in advanced analytics and multi-model data processing engines. More particularly, SAP HANA is an in-memory database system.

In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

To provide further context for implementations of the present disclosure, and as introduced above, software systems can be provisioned by software vendors to enable enterprises to conduct operations. In some instances, software systems can include or operate in association with a database system, such as SAP HANA introduced above. In general, database systems provide for storage, organization, and analysis of large volumes of data. A database system employs fundamental data definitions and processing based on a data model (relational model), where a data definition defines a data type with metadata associated therewith. A data definition can provide a database structure (e.g., columns, tables). In some instances, a query language (e.g., the Structured Query Language (SQL)) is used to define, read, and manipulate data within a database system.

Software systems can include various applications that provide functionality for execution of enterprise operations. Applications can be provided in an application layer that overlies a database system and enable interactions with the database system (e.g., reading data, writing data, manipulating data). In some instances, applications provided by a software vendor leverage data models (e.g., entity-relationship models (ERMs), also referred to as relational models), which provide semantics on the underlying data and ease consumption of the software system by the user. At a high level, data models enable consistent definition and formatting of database contents and sharing of data across disparate applications.

In traditional arrangements, data modeling tools (e.g., such as tools included with SAP NetWeaver Application Server (SAP NetWeaver AS) ABAP, also provided be SAP SE) can be used with applications at the application-level to provision data models (e.g., the ABAP data dictionary (DDIC), which stores definitions of objects, such as database tables and views). In such traditional arrangements, data models are defined and consumed on the application server. As such, data is retrieved from the database system and calculations on the data are executed at the application-level (i.e., on the application server). This can require movement of relatively large volumes of data back-forth between the application server and the database system.

With the advent of more powerful database systems, such as in-memory database systems including SAP HANA, the power of the database system is leveraged to achieve a so-called code-to-data approach (also referred to as code pushdown approach), which moves the data model and calculations from the application-level to the database-level. In this manner, data-intensive calculations are performed within the database system and movement of data to application servers is avoided.

To take advantage of the code pushdown approach, data modeling infrastructures are introduced. As a non-limiting example, Core Data Services (CDS), provided by SAP SE, was introduced to enable definition and consumption of data models on the database server (database-level) rather than on an application server (application-level). In general, CDS can be described as a data modeling infrastructure that simplifies and harmonizes the definition and consumption of data models, regardless of the consumption technology. Data modeling infrastructures, such as CDS, provide capabilities including, but not limited to, support for conceptual modeling and relationship definitions, built-in functions, and extensions. In some instances, a data modeling infrastructure can be implemented at the application-level, enabling developers to work in application-level development tools, while the execution of resulting code is pushed down to the database-level (hence, referred to as code-to-data or code pushdown). In some examples, CDS enables views (referred to CDS views) to be defined, which provide views on data within the database system. In general, a view can be described as defining a result set of a query on data stored in one or more tables within a database system. A view does not form part of the actual database schema and is, instead, a virtual table that is dynamically computed from data in the database when access to that view is requested. In this manner, any changes to data in one or more tables underlying the view are represented in subsequent invocation of the view. At runtime, a view is parsed to provide a view abstract syntax tree (AST), which is used to generate runtime data objects that are leveraged by one or more runtime components for accessing data within the database system.

Decentralized systems have been developed to enhance information security. Whereas a centralized system, such as a traditional database system, centrally stores data in a few nodes under the control of a single entity, a decentralized system stores data across numerous nodes, which are not controlled by any single entity. An example decentralized system includes a so-called distributed ledger system (DLS), which can also be referred to as a consensus network, and/or a blockchain network. DLSs enable participating entities to securely, and immutably store data within a distributed ledger, also referred to as a blockchain. The distributed ledger is decentralized in that multiple nodes in the DLS have to reach consensus as to the information stored in the distributed ledger, and in that a copy of the ledger is stored in numerous nodes across the DLS. Once stored in the distributed ledger, the data is considered to be immutable.

A distributed ledger (blockchain) is made up of a chain of blocks, each block storing data. Example data includes, without limitation, data representative of a data object created in relation to interactions between two or more entities, and data representative of a data object stored within a database system. While data objects are used herein by way of non-limiting example, it is contemplated that any appropriate data can be stored in a blockchain (e.g., documents, images, videos, audio). Data stored to the blockchain may be represented as hash values, which are generated and stored by executing transactions within the DLS. Once stored in the distributed ledger, the data is considered to be immutable. That is, the hash values stored in the blockchain cannot be changed. In view of this, a distributed ledger can be described as a data structure that stores data in a way that the data is immutable and can be verified. Each block in the blockchain is an aggregate of multiple transactions and is linked to a previous block immediately before it in the blockchain by including a cryptographic hash of the previous block. A block also includes a timestamp, its own cryptographic hash, and data.

The DLS can be described as a peer-to-peer network that enables participating entities to securely and immutably conduct transactions and store data. The peer-to-peer network can be described as a plurality of interconnected nodes, each node being a computing device that uses a client to validate and relay transactions (e.g., resource transfers, data object manipulations). Multiple nodes across the peer-to-peer network maintain a copy of the distributed ledger, which can be automatically downloaded to a node upon the node joining the peer-to-peer network. A consensus protocol provides a secure and reliable method of updating the distributed ledger, and copies of the distributed ledger are distributed across the peer-to-peer network with each update, without a central authority.

With the increasing popularity of DLSs, software vendors seek to develop DLS-enabled applications to leverage the benefits of DLSs. In some examples, a DLS-enabled application can be described as an application that interacts with a DLS to store and/or verify data to perform functionality (e.g., functionality in support of operations of an enterprise). However, implementing a productive DLS-enabled application can be a time- and resource-intensive endeavor. For example, a DLS needs to be created, which includes, among other things, managing nodes, channels, organizations, governance rules, determining block-sizing, and the like. As another example, operation-specific DLS-enabled application need to be developed to interact with the DLS and perform functionality that is specific to an enterprise and/or industry, for which the DLS-enabled is provisioned. For example, and with non-limiting reference to a supply chain, a first DLS-enabled application can provide functionality specific to operations of a supplier, while a second DLS-enabled application can provide functionality specific to operations of a transporter. Further, DLS-enabled applications are dependent on the choice of DLS platform (e.g., applications are completely different from one DLS platform to other DLS platforms due to runtime, programming model, development libraries, and the like). For example, coding for a distributed ledger maintained on HyperLedger is different from coding for a distributed ledger used in MultiChain applications. Other example tasks can include deploying the DLS-enabled applications for execution with a DLS network, lifecycle management for the DLS-enabled applications (e.g., versioning, updates, deletion), and integration of non-DLS-enabled applications with the deployed DLS-enabled applications (e.g., maintaining transactional consistency between non-DLS-enabled applications and DLS-enabled applications). These example tasks need to be achieved using technical solutions that provide time- and resource-efficiency.

In view of the above context, implementations of the present disclosure provide an ADDIS for developing, deploying, and integrating DLS-enabled applications. In further detail, the ADDIS of the present disclosure encapsulates multiple concepts that are independent, but related: DLS-agnostic design-time, DLS deployment-time, and runtime integration. With regard to DLS-agnostic design-time, the ADDIS enables data model enrichment and configuration to automatically generate intermediate representative (IR) artifacts that are DLS-agnostic (i.e., are not specific to any particular DLS platform). With regard to DLS deployment-time, the DLS-agnostic IR artifacts are used to generate DLS-specific entities, which are specific to the DLS that the DLS-specific entities are to be deployed to. As described in further detail herein, this includes provision of application programming interface (API) services and efficient deployment and automated creation of distributed ledger code, also referred to herein as chaincode. In some examples, the chaincode embodies at least a portion of the DLS-enabled application. With regard to runtime integration, data transformation is executed (e.g., transforming data from database rows to blocks) and is moved from non-DLS applications to the DLS. As described in further detail herein, this can include concurrently updating the distributed ledger and updating application data in the database.

Implementations of the present disclosure are described in further detail herein with reference to an example use case. The example use case includes at least a portion of a supply chain, in which a supplier (e.g., ABC Manufacturer) supplies products to a company (e.g., XYZ Company) through a transporter (e.g., QRS Transporter). It is contemplated, however, that implementations of the present disclosure can be realized in any appropriate use case.

FIG. 1 depicts an example architecture 100 in accordance with implementations of the present disclosure. In the depicted example, the example architecture 100 includes a presentation logic layer 102, an application server layer 104 and a database system layer 106. The presentation logic layer 102 is coupled to the application server 104 and CDS 108, referenced here as a non-limiting example, functionally spans the application server 104 and the database system 106. For example, the CDS 108 can provide one or more development tools at the application server layer 104 that can be used to develop view extensions that are processed to provide runtime data objects in the database system layer 106.

The database system layer 106 includes calculation logic (not shown) that is designed to interact with data stored therein. The calculation logic of the database system 106 can be performed by various engines (e.g., SQL engine, calculation engine, SQL script) to provide data definition and processing based on a database schema 110 in view of a relational model. The data definition includes, but is not limited to, defining of data types, associated metadata, and the database structure (e.g. columns, tables). In some implementations, the application layer 104 executes functionality for communication with the database system 106 (e.g., using SQL statements).

In further detail, the application server 104 includes application logic 112, which can implicate CDS views and extensions, as described herein. For example, during runtime, execution of an application can result in a view on data in the database system layer 106. In some implementations, the application logic 112 of the application server 104 can be implemented using any appropriate programming language (e.g., River Definition Language (RDL), JavaScript (JS)). In some examples, the application logic 112 references model concepts, such as entities and relationships, that are not reflected in the basic syntax of a query language (e.g., SQL). In some examples, the application logic 112 can include common languages for defining and consuming data across different containers (e.g., ABAP, Java).

As discussed in further detail herein, the CDS 108 functionally spans the application server layer 104 and the database system layer 106. The CDS 108 can include a common set of domain-specific languages (DSL) and services or applications which provides functionalities. The CDS 108 enables defining and consuming semantically rich data models as an integral part of the database system 106, such that data-intensive calculations can be pushed down to the database system layer 106. As a result, the development of functionality of services/applications and related data models (e.g., data sets and data entities) can executed at the application server layer 104, and calculations and data access can be executed at the database system layer 106.

The presentation logic layer 102 is coupled for communication with the application server layer 104 and presents content received from the application server layer 104 to clients. For example, the presentation layer 102 can generate one or more user interfaces (UIs) that enable users to interact with the application server layer 104 (e.g., provide input to and receive output from the application logic 112). The UIs can be provided using any appropriate technology (e.g., Hypertext Markup Language (HTML), cascading style sheets (CSS), Java Script (JS)) and/or a variety of UI technologies.

The example architecture 100 is representative of CDS provided by SAP SE. While, for purposes of non-limiting illustration, implementations of the present disclosure are described in further detail herein with reference to CDS, implementations of the present disclosure can be realized with any appropriate products and/or services.

Figure 2:
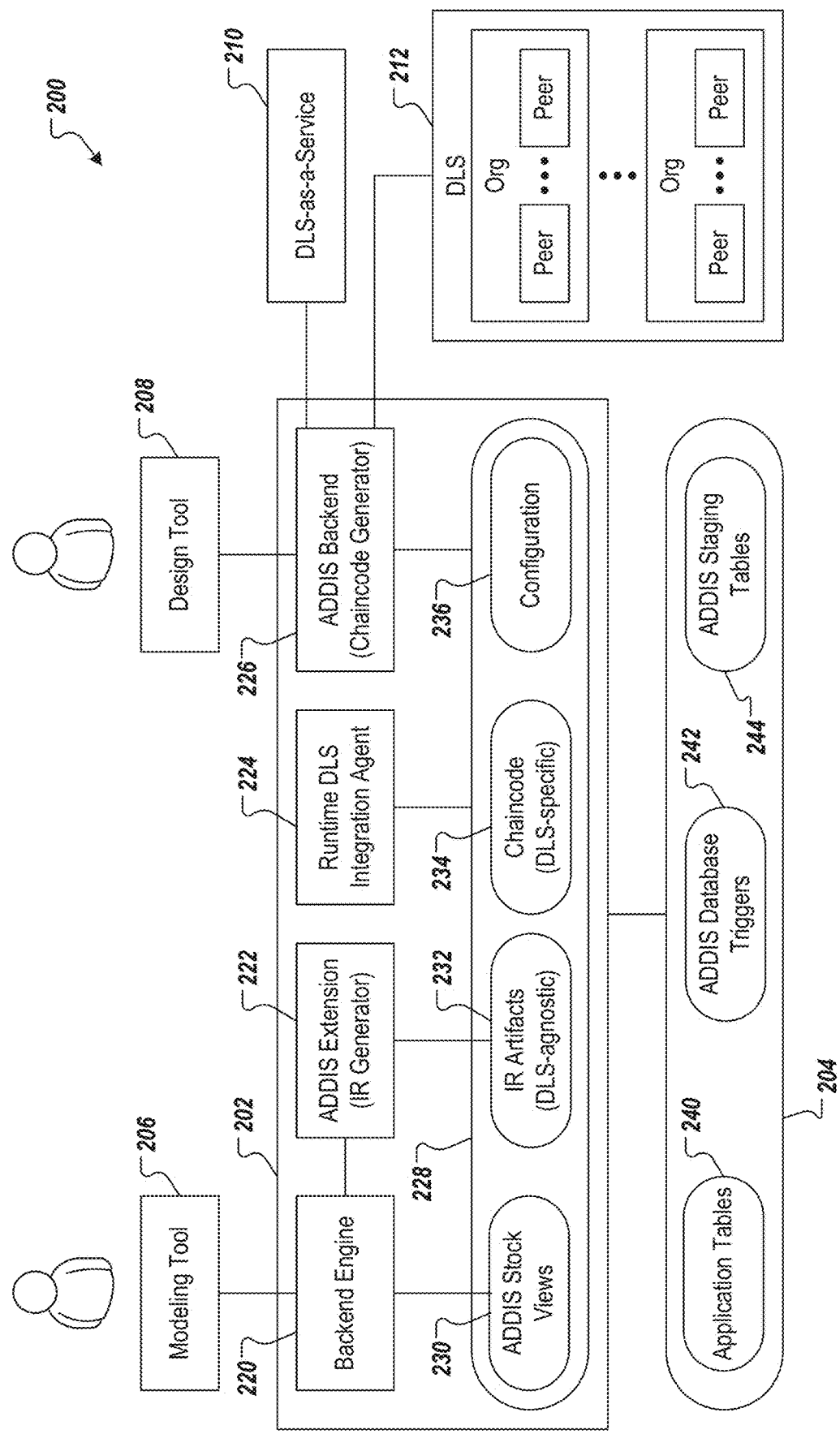
FIG. 2 depicts a conceptual architecture in accordance with implementations of the present disclosure.

FIG. 2 depicts a conceptual architecture 200 in accordance with implementations of the present disclosure. As described in further detail herein, the conceptual architecture 200 includes the ADDIS of the present disclosure to provide functionality for DLS-agnostic design-time, DLS-specific deployment-time, and runtime integration, each of which is introduced above and is described in further detail herein. In the example of FIG. 2, the conceptual architecture 200 includes a service environment 202, a database system 204, a modeling tool 206, a design tool 208, a DLS-as-a-Service (DLSaaS) platform 210, and a DLS 212 (i.e., a peer-to-peer network maintaining a distributed ledger). In some examples, users can interact with the service environment 202 through the modeling tool 206 (e.g., the ABAP development tool (ADT) provided by SAP SE) to enrich data models with DLS-relevant information during design-time, as described in further detail herein. In some examples, users can interact with the service environment 202 through the design tool 208 to provide, for example, configuration information during deployment-time, as described in further detail herein.

In some implementations, the DLSaaS platform 210 enables applications to leverage existing DLSs (e.g., the DLS 212). That is, the DLSaaS platform 210 enables applications (e.g., executing in the application layer 104 of FIG. 1) to immutably store data to and verify data with the DLS 212, which is an existing DLS. An example DLSaaS platform 210 includes, but is not limited to, the SAP Cloud Platform (SCP) Blockchain Service, which is deployed with SAP Leonardo.

In some implementations, the service environment 202 is provided as at least a portion of a data modeling infrastructure, such as CDS (e.g., at least a portion of the CDS 108 of FIG. 1). In the example of FIG. 2, the service environment 202 includes a backend engine 220, an ADDIS extension module 222, a runtime DLS integration agent 224, an ADDIS backend 226, and a datastore 228. In the depicted example, the datastore 228 stores ADDIS stock views 230, IR artifacts 232, chaincode 234, and configuration data 236. In some examples, the ADDIS stock views are provided by a vendor (e.g., views for pre-defined use cases from a vendor of applications that are to be DLS-enabled). In the depicted example, the database system 204 (e.g., the database system 106 of FIG. 1) stores one or more application tables 240 (e.g., tables that store data that is to be used by a non-DLS-enabled application), as well as ADDIS database triggers 242 and ADDIS staging tables 244, which are described in further detail herein.

In some implementations, the modeling tool 206, at least a portion of the service environment 202 (e.g., the backend engine 220), and the application tables 240, as well as the database system 204, are provided as part of the data modeling infrastructure (e.g., CDS). In some implementations, the design tool 208, at least a portion of the service environment 202 (e.g., the ADDIS extension module 222, the runtime DLS integration agent 224, the ADDIS backend 226, and the datastore 228), as well as the ADDIS database triggers 242 and the ADDIS staging tables 244 are provided as part of the ADDIS of the present disclosure.

In some implementations, components of the conceptual architecture 200 can be deployed in a cloud computing environment. For example, and without limitation, the backend engine 226 and the modeling tool 206, among other components, can be deployed in the cloud with necessary cloud connectors. In some implementations, components of the conceptual architecture 200 can be deployed in an on-premise environment (e.g., a datacenter of an enterprise). For example, the backend engine 220 is deployed to the cloud and connects the modeling tool 206 (e.g., a user interface (UI) component) to on-premise components and/or other cloud-based components.

In some implementations, the modeling tool 206, the backend engine 220, and the ADDIS extension module 222 are used during the design-time to provide the IR artifacts 232, the ADDIS database triggers 242, and the ADDIS staging tables 244 based on the ADDIS stock views 230 and the application tables 240, as described in further detail herein. In some implementations, the design tool 208 and the ADDIS backend 226 are used during deployment-time to provide the chaincode 234 based on the IR artifacts 232 and the configuration data 236, as described in further detail herein. In some implementations, the runtime DLS integration engine 224 enables execution of the DLS-enabled application, which is at least partially embodied in the chaincode 234, to store and/or verify data in the DLS 212.

In accordance with implementations of the present disclosure, execution of the DLS-enabled application is performed concurrently with execution of a non-DLS-enabled application. For example, and without limitation, a non-DLS-enabled application can include a supply chain management (SCM) application that an enterprise (e.g., XYZ Company) uses to conduct operations. In some examples, the non-DLS-enabled application interacts with data stored in application tables (e.g., the application tables 240). Example interactions can include, without limitation, writing data to, deleting data from, and editing data in an application table. As described in further detail herein, at least a portion of data in an application table can be stored in the DLS through execution of the DLS-enabled application (i.e., the chaincode). For example, interactions with an application table are automatically recorded to a staging table (e.g., of the staging tables 244) using database triggers, and data of the staging table is stored in the DLS through execution of the DLS-enabled application. In this manner, a history of transactions (e.g., interactions) with an application table can be immutably stored in the DLS.

In accordance with implementations of the present disclosure, during design-time, one or more data models are enriched with DLS-relevant information, also referred to herein as blockchain-relevant information. As introduced above, data models represent a semantic layer that maps to actual database-dependent application tables, such as the application tables 240. In some examples, the backend engine 220 reads application table metadata or data models depending on technology/platform where the backend engine 220 is integrated. An example data model can include, without limitation, a CDS view, introduced above, which has an ABAP application table (i.e., an application table 240) associated therewith.

In some examples, a user can use the modeling tool 206 to annotate a CDS view to provide a DLS-enriched view. The annotations provide flexibility for the user to enable or disable application data to be DLS-relevant. For example, an annotated view is a DLS-enriched view, while a non-annotated view is not. In short, annotations can be added or removed from a view to provide a DLS-enriched view, as needed. In some examples, this can be done on a table-field level of the database.

In some examples, pre-enriched data models (e.g., ADDIS stock views 230) can be provided to address contemplated applications based on vendor or source system types. In some examples, a modeling workflow is simplified for consumption where users can connect to a source system and activate pre-enriched data models. By way of non-limiting example, for SAP S/4 HANA, a prepackaged DLS scenario, such as SCM, can be supported and can include pre-enriched data models (e.g., a DLS-enriched shipment order).

With reference to the example use case, a user (e.g., technology consultant) of XYZ Company identifies an underlying standard CDS view for delivery timestamp and delivery quantity. The user enhances the CDS view with DLS annotations to enable integration with a DLS. Example annotations include, but are not limited to, a DLS-enable annotation and a DLS attribute annotation. In some examples, the DLS-enable annotation is set to true to enable the view for DLS integration, or false to disable the view for DLS integration. If the DLS-enable annotation is absent from the view, the view is not a DLS-enriched view. In some examples, the DLS attribute annotation indicates at least one field of an application table that is a DLS-enabled field.

By way of non-limiting example, an example DLS-enriched view can be provided as a view on an EKBE table. The EKBE table can be described as a standard table provided by SAP SE, which is used to store History per Purchasing Document data. The example DLS-enriched view is provided as:

```
@ADDIS.BCEnable: 'true'
@ADDIS.Participant: 'EKBE.EKORG'
@ADDIS.Asset: 'EKBE.MATNR'
@ADDIS.Scenario: 'Purchase'
@ADDIS.BCAttribute: 'EKBE.CPUTM'
@ADDIS.BCAttribute: 'EKBE.MENGE'
define view m_v_poh_ekbe_c as
    select from m_v_poh_ekbe as ekbe
    {
        key ekbe.ebeln,
        key ekbe.ebelp,
        key ekbe.zekkn,
        key ekbe.vgabe as vgabe,
        ekbe.meins,
        ekbe.pstyp,
        ekbe.vrtkz,
        ekbe.bewtp as bewtp,
        ekbe.menge,
        ...
    }
```

Example DLS-Enriched EKBE View

In the example DLS-enriched view, the DLS-enable annotation @ADDIS.BCEnable: 'true', @ADDIS.Scenario: 'Purchase' and the DLS attribute annotations @ADDIS.BCAttribute: 'EKBE.CPUTM' @ADDIS BCAttribute: 'EKBE.MENGE' are provided, which enable the view for DLS use (i.e., makes the view a DLS-enriched view) in the DLS scenario "Purchase." In the above example, CPUTM is a standard field, which stores Time of Entry information, MENGE is a standard field, which stores quantity, and @ADDIS.Participant: 'EKBE.EKORG' and @ADDIS.Asset: 'EKBE.MATNR' are used to provide transactional context.

In some examples, a table annotation is provided to indicate an application table having data stored therein that is to be recorded in the DLS. That is, data from all fields of the application table is to be recorded in the DLS. In some examples, a field annotation is provided to indicate one or more fields of an application table having data stored therein that is to be recorded in the DLS. That is, data from less than all fields of the application table is to be recorded in the DLS.

As described in further detail herein, DLS-enriched views are activated, and the ADDIS interprets the DLS-relevant annotations to generate the IR artifacts (i.e., by the ADDIS extension 222 of FIG. 2). In some implementations, an IR artifact includes the DLS agnostic information that is used to create a DLS application as chaincode. In some examples, the IR artifact includes an application name, which is by default a CDS name. In some examples, the IR artifact identifies different entities such as, for example and without limitation, participants, assets, transactional data, and scenario. Participants (also referred to as parties or business partners) include entities that are involved in the underlying transaction. Assets are the primary asset dealt by the participants and assets are represented with a unique identifier. DL-relevant attributes are represented as transaction data. In some examples, an IR artifact can also support a scenario, which is used to group related IR artifacts. Further, network configuration, access control, and the like can be defined for a scenario during deployment phase. For example, a scenario "purchase" creates a new scenario "purchase" (if does not already exist) and all of the IR artifacts are grouped under this scenario.

In some examples, IR artifacts support versioning and lifecycle management. In general, CDS views are handled by a central CDS backend engine. An ADDIS extension (also known as IR Generator) is added to CDS backend engine (see, e.g., FIG. 2) for DLS-specific annotations. The annotations starting with ADDIS.* are processed by ADDIS extension to create the IR artifacts. For example:

```
application m_v_poh_ekbe_c
using EKBE.EKORG as participant of string type
using EKBE.MATNR as asset of number type
using EKBE.CPUTM as data of integer type
using EKBE.MENGE as data of timestamp type
using 'Purchase' as scenario
using 1.0 as version
```

Figure 3:
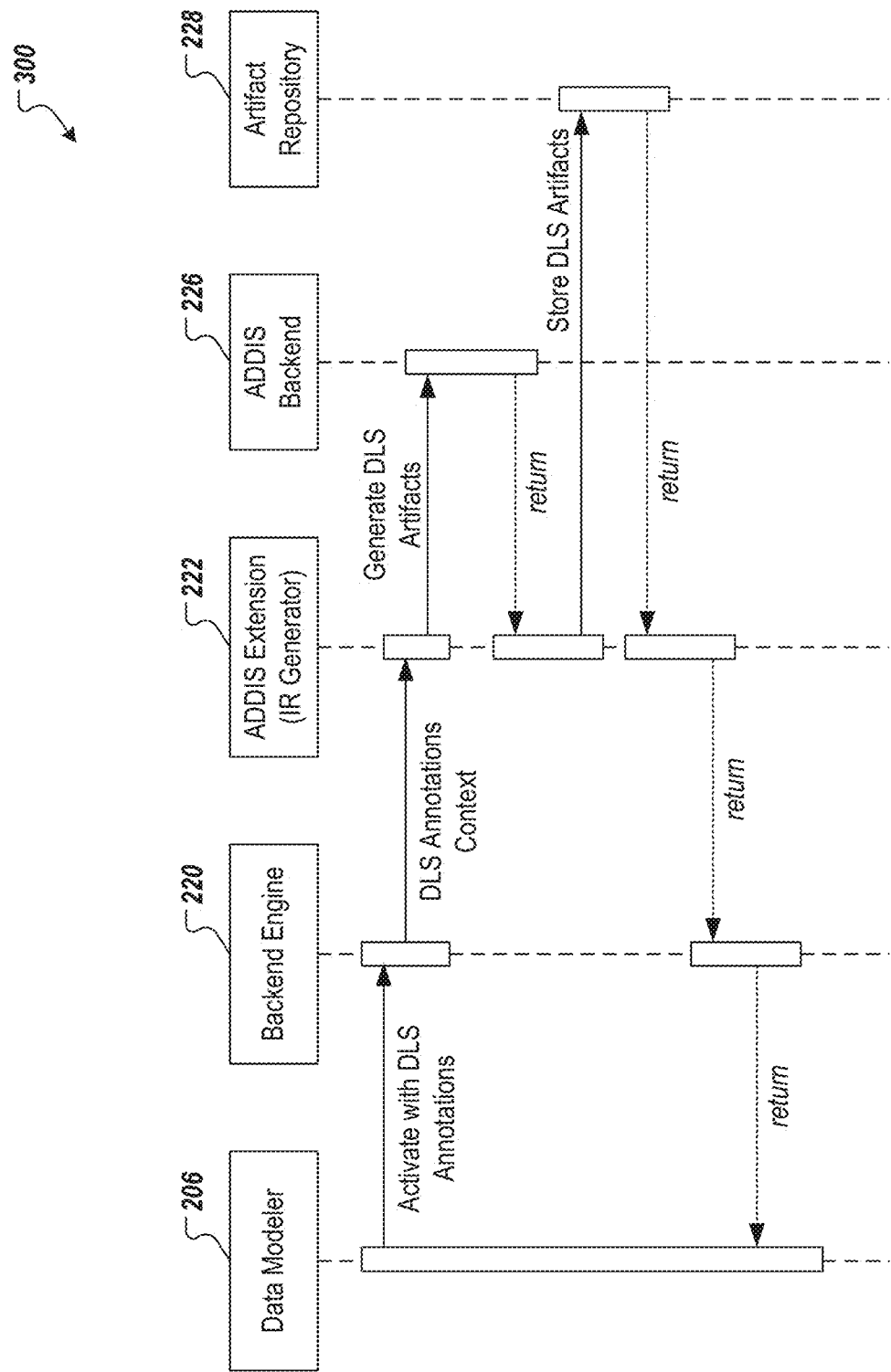
FIG. 3 depicts an example signal flow diagram for design-time in accordance with implementations of the present disclosure.

FIG. 3 depicts an example signal flow diagram 300 for design-time in accordance with implementations of the present disclosure. The example of FIG. 3 includes the modeling tool 206, the backend engine 220, the ADDIS extension 222, the ADDIS backend 226, and the datastore 228 (artifact repository).

The signal flow diagram 300 of FIG. 3 generally represents a modeling workflow that includes identifying data models from a source system that are to be DLS enriched, defining a DLS scenario (e.g., a high-level project which contains all artifacts), importation of all DLS-enriched data models from source system, enriching the data models with annotations to define how the data model is to be handled (e.g., whether the entire table is DLS-relevant, or whether primary key with selected columns are DLS-relevant), and saving and activating the changes to the data model to provide a DLS-enriched data model. In some examples, and as described in further detail herein, output of the design-time includes the DLS-enriched data model, staging tables (e.g., that enable automatic movement of data from application tables to a DLS), and IR artifacts that are DLS-agnostic (i.e., are not specific to any particular DLS platform).

As discussed above, upon activation of DLS-enriched data models, staging tables and database triggers are created. The DLS-enriched data model maps at least one application table to a respective staging table. A database trigger can be described as computer-executable code that is responsive to a change to an application table and replicates the change in a respective staging table. During production use of a corresponding application, all data (e.g., transaction data) is captured and staged for future movement to the DLS. Each staging table records a full and complete transaction history of the DLS-enriched data model. Further, each transaction of a respective application table will correspond to a block in a distributed ledger (blockchain) maintained in the DLS. That is, and as described in further detail herein, transactions acting on the application table are recorded in the staging table and, from the staging table, are recorded to the distributed ledger of the DLS at least partially through execution of the chaincode.

By way of non-limiting example, the following example application table and staging table can be considered:

| Example Application Table | |
|---|---|
| Order Number | Supplier |
| 123 | ABC Manufacturer |

| Example ADDIS Staging Table | |
|---|---|
| Order Number | Supplier |
| 123 | ABC Manufacturer |

After activation of an underlying DLS-enriched view (data model), both the application table and the staging table initially have the same content. If the supplier of order number 123 is updated from ABC Manufacturer to QRS Transporter in the application table, a database trigger is responsive to the update and records the update in the staging table. This can be depicted as follows:

| Example Application Table - After Update | |
|---|---|
| Order Number | Supplier |
| 123 | QRS Transporter |

| Example ADDIS Staging Table - After Update | |
|---|---|
| Order Number | Supplier |
| 123 | ABC Manufacturer |
| 123 | QRS Transporter |

As depicted in the example above, the staging table contains both the historical records of order 123. In this manner, when data of the staging table is added to the DLS, all of the historical records are recorded into blocks in the DLS, as described in further detail herein. In some examples, when data of the staging table is added to the DLS, the data (i.e., representative of records stored in the staging table) is deleted from the staging table. For example:

| Example Application Table - After Data Stored to DLS | |
|---|---|
| Order Number | Supplier |
| 123 | QRS Transporter |

| Example ADDIS Staging Table - After Data Stored to DLS | |
|---|---|
| Order Number | Supplier |

With regard to deployment-time, the DLS-agnostic IR artifacts are converted to DLS-specific entities. The structure of a DL-specific entity depends on the choice of DLS technology (i.e., the DLS that is to be used), because each DLS technology has a respective programming model. For example, and without limitation, the programming model for Hyperledger Fabric is different from that of Hyperledger Sawtooth or Multichain. By way of non-limiting example, if Hyperledger Fabric is selected as the target DLS technology, the IR artifacts are converted to Hyperledger Fabric artifacts. Hyperledger Fabric artifact represents participants, assets, and transactions in the native format as represented in the following examples:

```
m_v_poh_ekbe_c.ts
    import { Object, Property } from 'fabric-contract-api';
    @Object( )
    export class m_v_poh_ekbe_c{
        @Property( )
        public EKBE.EKORG: string;
        @Property( )
        public EKBE.MATNR: string;
        @Property( )
        public EKBE.CPUTM: string;
        @Property( )
        public EKBE.MENGE: string;
    }
m_v_poh_ekbe_c_contract.ts
    import { Context, Contract, Info, Transaction } from
'fabric-contract-api';
    @Info({title: m_v_poh_ekbe_c_contract})
    export class m_v_poh_ekbe_c_contract extends Contract{
        @Transaction( )
        public async Create(ctx: Context, Id: string, value:
number, owner: string) : Promise<void> {
            ...
            await ctx.stub.putState(Id, buffer) ;
        }
        @Transaction(false)
        public async Read(ctx: Context, Id: string) :
Promise<string> { ...
            return recordJSON.toString( ) ;
        }
        @Transaction( )
        public async Update(ctx: Context, Id: string, newValue:
number) : Promise<void> {
            ...
        }
        @Transaction( )
        public async Delete(ctx: Context, Id: string) :
Promise<void> {
            ...
            await ctx.stub.deleteState(Id);
        }
    }
```

In the above examples, m_v_poh_ekbe_c_contract_index.ts is the entry point, which also initializes chaincode with the initial state for the transactions. Additional configuration information, such as type of DL technology, network configuration, access control, and the like, is provided for the scenario in the design tool. The design tool connects to the chaincode generator (see, e.g., FIG. 2). The ADDIS backend contains chaincode generators for different DLS technologies in their respective formats.

Figure 4:
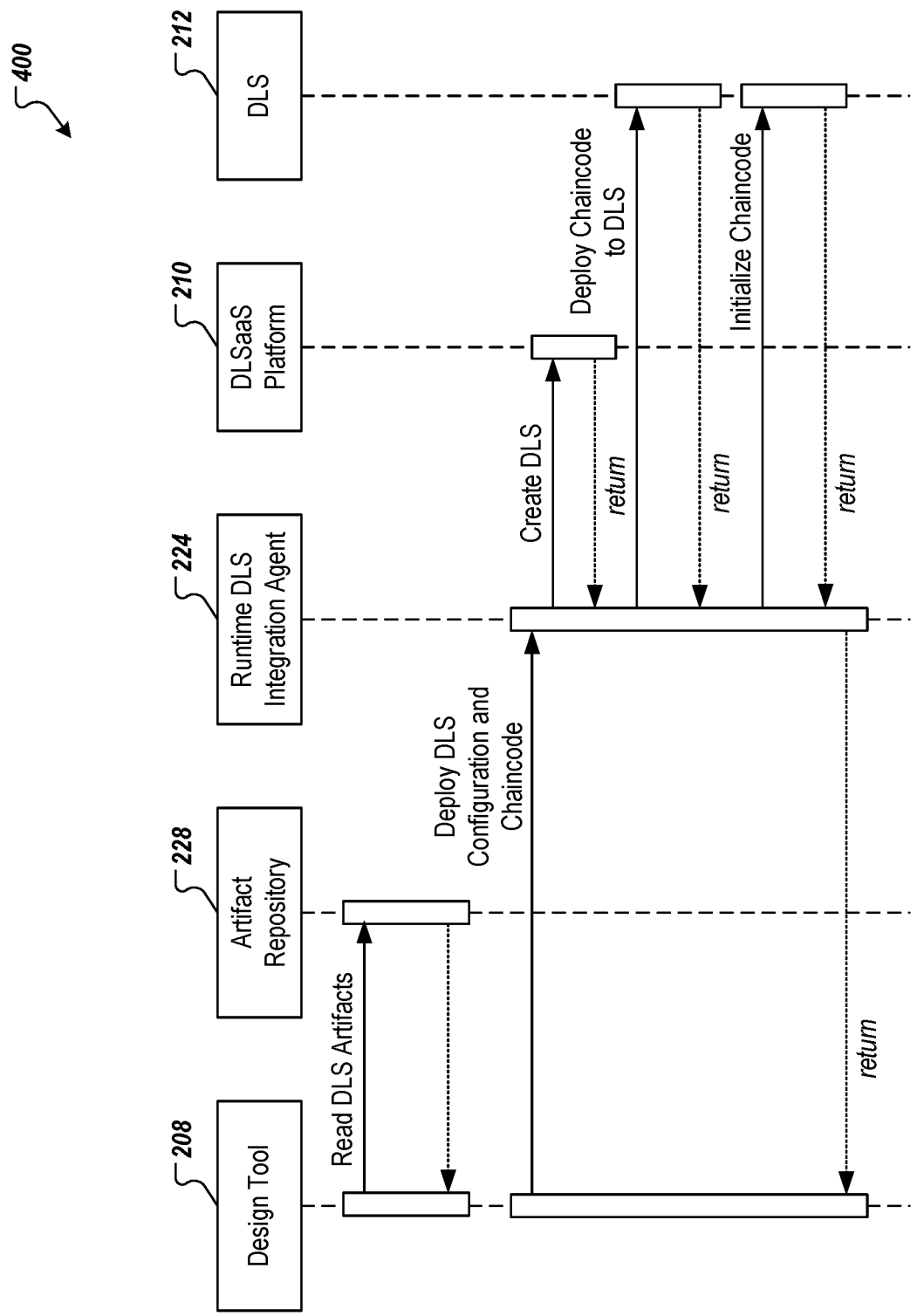
FIG. 4 depicts an example signal flow diagram for deployment in accordance with implementations of the present disclosure.

FIG. 4 depicts an example signal flow diagram 400 for deployment in accordance with implementations of the present disclosure. The example of FIG. 4 includes the design tool 208, the artifact repository 228, the runtime DLS integration agent 224, the DLSaaS platform 210, and the DLS 212.

To initiate deployment, a user accesses the design tool 208 of FIG. 2 through a UI for interaction with the ADDIS backend 226, which is configured to provide the DLS-specific entities for a designated DLS (e.g., Ethereum, MultiChain). More particularly, the user provides a DLS configuration for the active DLS scenario (e.g., the DLS, to which data is to be recorded). Example configuration information can include, without limitation, a type of DLS, and DLS network details (e.g., organizations, peers, user management, governance rules and policies. In some examples, the ADDIS backend 226 invokes a hyper-scaler or a DLSaaS provider (e.g., SCP Blockchain Service) and creates a distributed ledger based on the DLS network configuration.

In accordance with implementations of the present disclosure, a DLS-enabled application is generated and is at least partially embodied in chaincode. The DLS-enabled application is specific to the particular DLS indicated in the DLS configuration. In the context of the present disclosure, chaincode can be described as computer-executable code that is deployed to and executed within a DLS to perform functionality (e.g., store data to the DLS, verify data within the DLS). The chaincode (DLS-enabled application) is deployed to the DLS 212. In some examples, the outcome of deployment-time is a fully-functional DLS 212, and a DLS-enabled application that is deployed to the DLS 212 and that can be consumed (e.g., by a SDK, through RESTful API's).

With reference to the example use case, a user (e.g., a technology consultant) of Company XYZ uses the ADDIS design tool (e.g., the design tool 208 of FIG. 2) to convert the IR artifacts to actual DLS-specific entities, which are specific to a first DLS platform being used (e.g., Ethereum). The DLS-specific entities are deployed to the DLS (e.g., the DLS 212 of FIG. 2) for immutable storage therein. As a non-limiting example, in Company XYZ subsequently chooses another supplier that wants to leverage a second DLS platform (e.g., MultiChain), the design tool 208 can be used to generate DLS-specific entities for the second DLS without any changes to the data model (i.e., the DLS-enriched view, which is agnostic to the DLS platform that is to be implemented). In some examples, the design tool 208 interacts with the ADDIS backend 226 (chaincode generator), which consumes a configuration for the DLS configuration (e.g., stored as configuration data 236). Example configurations include, without limitation, type of DLS and network details (e.g., organization, peers, user management etc.). Also, database triggers are enabled on the underlying database tables to record database changes at runtime, as described in detail herein.

In accordance with implementations of the present disclosure, during runtime, one or more runtime daemons (not shown) monitor the database system 204 to determine whether data has been pushed to the database system 204. In some examples, runtime refers to production use of a non-DLS-enabled application (e.g., a SCM application) that results in data being pushed to the database system 204 (e.g., data inserted to an application table, data updated within an application table). A runtime daemon can generally be described as a computer program that runs as a background process. An example runtime daemon includes, without limitation, the ABAP scheduler provided by SAP SE. On the database level, the database triggers automatically write data of one or more DLS-enabled fields of an application table into a respective staging table. The runtime daemon monitors and new records captured in a staging table and updates data in the DLS. That is, the runtime daemon pushed data from the staging table for storage in the DLS (e.g., as a transaction within a block of the distributed ledger). Upon successful update in the DLS, the corresponding records are deleted from the staging tables.

In further detail, during runtime (e.g., production use of an application), application transactions are temporarily staged in the staging tables using database triggers. For example, a database trigger is computer-executable code that is responsive to a change to an application table and replicates the change in a staging table. Transactions that are recorded in staging tables are recorded in the DLS 212 by the runtime DLS integration agent 224 (e.g., which includes or interacts with one or more runtime daemons). Transactions that are committed to DLS 212 can be monitored in real-time. After a transaction has been committed to the DLS 212, the underlying data representative of the transaction within the staging table can be removed from the staging table.

Figure 5:
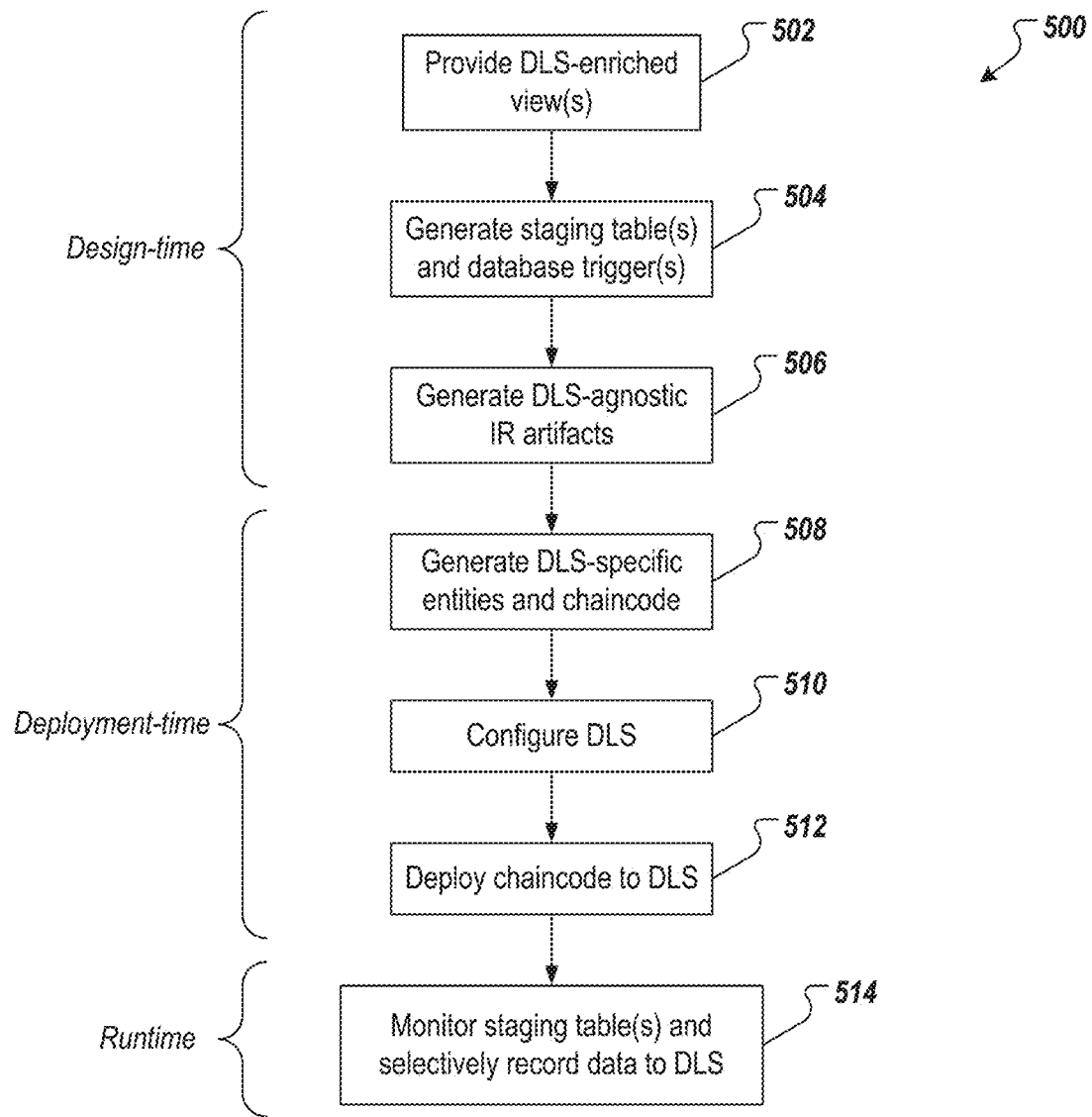
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

One or more DLS-enriched views are provided (502). For example, and as described herein, a DLS-enriched view is provided as a view that includes DLS annotations. Example DLS annotations include, but are not limited to, a DLS-enable annotation and a DLS attribute annotation. In some examples, the DLS-enable annotation is set to true to enable the view for DLS integration, or false to disable the view for DLS integration. In some examples, the DLS attribute annotation indicates at least one field of an application table that is a DLS-enabled field. In some examples, a DLS-enriched view is provided as a predefined (stock) DLS-enriched view (e.g., provided by a software vendor). In some examples, a DLS-enriched view is created by a user (e.g., the user using the modeling tool 206 to add annotations to a view).

One or more database triggers and one or more staging tables are generated (504). For example, and as described herein, DLS annotations of the DLS-enriched view are read to identify one or more application tables that are to be DLS-enabled and, for each application table, one or more fields that are to be DLS-enabled (i.e., data records in the field are to be written to the DLS). For each application table and field(s), a respective staging table is generated. In some examples, the staging table is initially generated as a clone of the application table including data stored in each of the DLS-enabled fields. In some examples, any non-DLS-enabled fields of the application table are absent from the respective staging table.

One or more DLS-agnostic artifacts are generated (506), DLS-specific entities and chaincode are generated (508), a DLS is configured (510), and chaincode is deployed to the DLS (512). For example, and as described herein, DLS-enriched views are activated, and the ADDIS interprets the DLS-relevant annotations to generate the IR artifacts, the IR artifacts are converted to DLS-specific entities, and a DLS configuration for the active DLS scenario is used to configure the DLS.

The one or more staging tables are monitored and data is selectively recorded to the DLS (514). For example, and as described herein, one or more runtime daemons monitor the staging tables for changes thereto. In some examples, in response to a change to a staging table (e.g., insertion of a data record, update of a data record), data of the staging table is recorded to the DLS. In some examples, after the data has been committed to the DLS, the data is deleted from the staging table.

Figure 6:
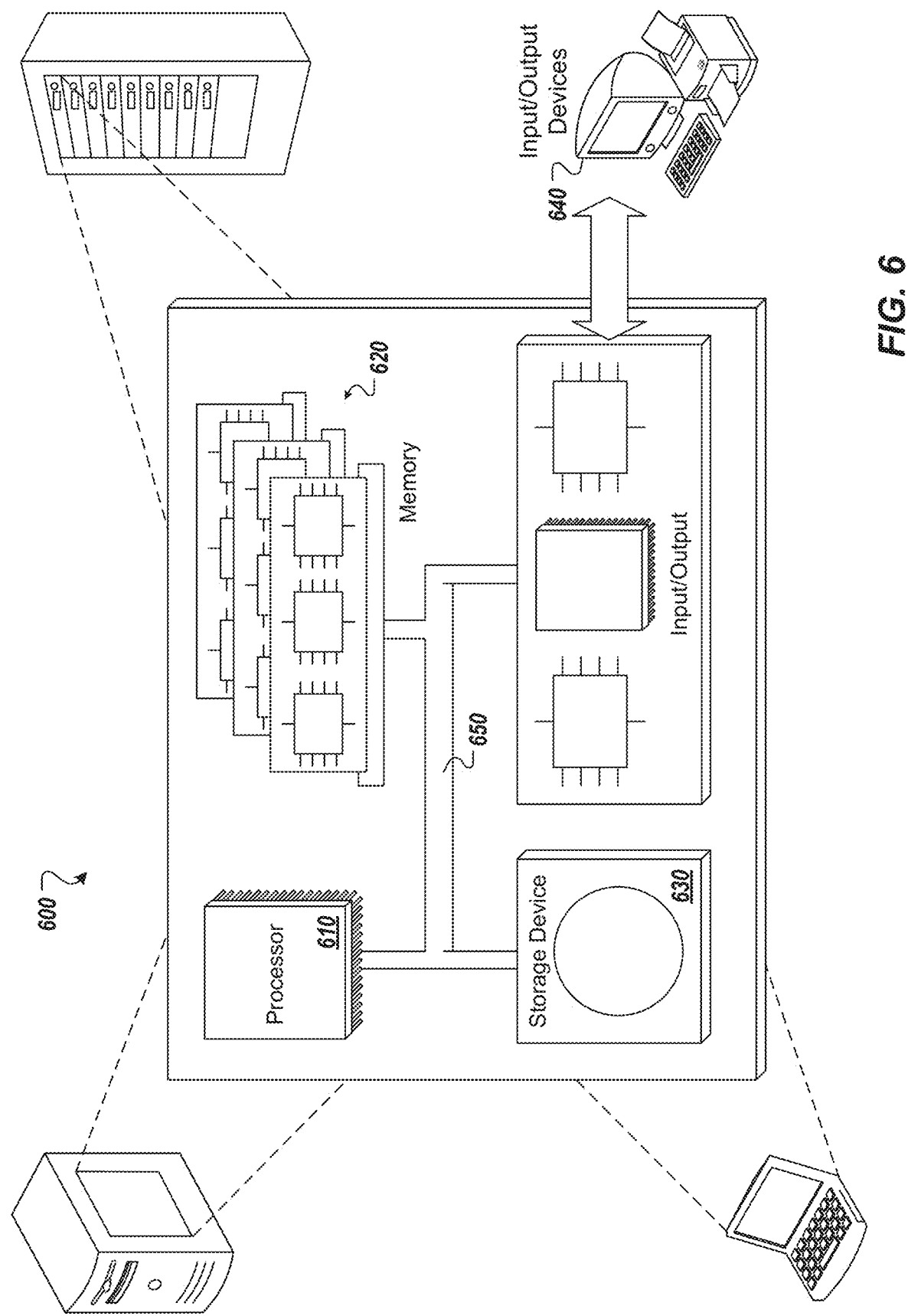
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for enabling an application for use with a distributed ledger system (DLS), the method being executed by one or more processors and comprising:
   providing a DLS-enriched view on data stored in a database system, the DLS-enriched view comprising a set of annotations indicating at least one application table and at least one field of the application table that is DLS-enabled, the data being stored in the database system based on a DLS-enriched data model provided from a pre-enriched data model;
   storing, in the database system, a staging table corresponding to the at least one application table and the at least one field of the at least one application table and a database trigger that is configured to write data from the at least one field of the at least one application table to the staging table in response to a change in the at least one application table, the staging table and the database trigger being created in response to the DLS-enriched data model, the DLS-enriched data model mapping the at least one application table to the staging table;
   during a design-time:
      providing at least one intermediate representative (IR) artifact based on the DLS-enriched view, and
      generating at least one DLS-specific entity and chaincode based on the at least one IR artifact and a configuration for the DLS, to which the chaincode is to be deployed;
   during a deployment-time, deploying the chaincode to the DLS; and
   during a run time, monitoring the staging table for changes and, in response to a change: recording data of the staging table to the DLS based on the chaincode, and automatically writing to the staging table using the database trigger.

2. The method of claim 1, wherein the set of annotations comprises a DLS-enable annotation and a DLS attribute annotation, the DLS attribute annotation indicating the at least one field.

3. The method of claim 1, wherein the IR artifact is DLS-agnostic.

4. The method of claim 1, wherein the chaincode is a DLS-enabled application that is specific to the DLS and comprises at least a portion of functionality of the application.

5. The method of claim 1, wherein the application selectively writes data to the at least one field.

6. The method of claim 1, wherein the at least one DLS-specific entity is specific to the DLS.

7. The method of claim 1, further comprising deleting the data from the staging table in response to confirmation that the data has been recorded to the DLS.

8. A non-transitory computer-readable storage medium coupled to one or more processors and having instructions stored thereon which, when executed by the one or more processors, cause the one or more processors to perform operations for enabling an application for use with a distributed ledger system (DLS), the operations comprising:
   providing a DLS-enriched view on data stored in a database system, the DLS-enriched view comprising a set of annotations indicating at least one application table and at least one field of the application table that is DLS-enabled, the data being stored in the database system based on a DLS-enriched data model provided from a pre-enriched data model;
storing, in the database system, a staging table corresponding to the at least one application table and the at least one field of the at least one application table and a database trigger that is configured to write data from the at least one field of the at least one application table to the staging table in response to a change in the at least one application table, the staging table and the database trigger being created in response to the DLS-enriched data model, the DLS-enriched data model mapping the at least one application table to the staging table;
during a design-time:
providing at least one intermediate representative (IR) artifact based on the DLS-enriched view, and
generating at least one DLS-specific entity and chaincode based on the at least one IR artifact and a configuration for the DLS, to which the chaincode is to be deployed;
during a deployment-time, deploying the chaincode to the DLS; and
during a run time, monitoring the staging table for changes and, in response to a change: recording data of the staging table to the DLS based on the chaincode, and automatically writing to the staging table using the database trigger.

9. The computer-readable storage medium of claim 8, wherein the set of annotations comprises a DLS-enable annotation and a DLS attribute annotation, the DLS attribute annotation indicating the at least one field.

10. The computer-readable storage medium of claim 8, wherein the IR artifact is DLS-agnostic.

11. The computer-readable storage medium of claim 8, wherein the chaincode is a DLS-enabled application that is specific to the DLS and comprises at least a portion of functionality of the application.

12. The computer-readable storage medium of claim 8, wherein the application selectively writes data to the at least one field.

13. The computer-readable storage medium of claim 8, wherein the at least one DLS-specific entity is specific to the DLS.

14. The computer-readable storage medium of claim 8, wherein operations further comprise deleting the data from the staging table in response to confirmation that the data has been recorded to the DLS.

15. A system, comprising:
a computing device; and
a computer-readable storage device coupled to the computing device and having instructions stored thereon which, when executed by the computing device, cause the computing device to perform operations for enabling an application for use with a distributed ledger system (DLS), the operations comprising:
providing a DLS-enriched view on data stored in a database system, the DLS-enriched view comprising a set of annotations indicating at least one application table and at least one field of the application table that is DLS-enabled, the data being stored in the database system based on a DLS-enriched data model provided from a pre-enriched data model;
storing, in the database system, a staging table corresponding to the at least one application table and the at least one field of the at least one application table and a database trigger that is configured to write data from the at least one field of the at least one application table to the staging table in response to a change in the at least one application table, the staging table and the database trigger being created in response to the DLS-enriched data model, the DLS-enriched data model mapping the at least one application table to the staging table;
during a design-time:
providing at least one intermediate representative (IR) artifact based on the DLS-enriched view, and
generating at least one DLS-specific entity and chaincode based on the at least one IR artifact and a configuration for the DLS, to which the chaincode is to be deployed;
during a deployment-time, deploying the chaincode to the DLS; and
during a run time, monitoring the staging table for changes and, in response to a change:
recording data of the staging table to the DLS based on the chaincode, and
automatically writing to the staging table using the database trigger.

16. The system of claim 15, wherein the set of annotations comprises a DLS-enable annotation and a DLS attribute annotation, the DLS attribute annotation indicating the at least one field.

17. The system of claim 15, wherein the IR artifact is DLS-agnostic.

18. The system of claim 15, wherein the chaincode is a DLS-enabled application that is specific to the DLS and comprises at least a portion of functionality of the application.

19. The system of claim 15, wherein the application selectively writes data to the at least one field.

20. The system of claim 15, wherein the at least one DLS-specific entity is specific to the DLS.

* * * * *